United States Patent
Chen et al.

(10) Patent No.: US 12,491,919 B2
(45) Date of Patent: Dec. 9, 2025

(54) DRIVER CONSOLE AND RAIL VEHICLE INCLUDING SAME

(71) Applicant: BYD COMPANY LIMITED, Guangdong (CN)

(72) Inventors: Yanjun Chen, Shenzhen (CN); Guangbing Mao, Shenzhen (CN); Jiayong Chen, Shenzhen (CN); Haorui Hong, Shenzhen (CN); Zhiwei Mu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 776 days.

(21) Appl. No.: 17/790,364

(22) PCT Filed: Dec. 1, 2020

(86) PCT No.: PCT/CN2020/133126
§ 371 (c)(1),
(2) Date: Jun. 30, 2022

(87) PCT Pub. No.: WO2021/135791
PCT Pub. Date: Jul. 8, 2021

(65) Prior Publication Data
US 2023/0041898 A1  Feb. 9, 2023

(30) Foreign Application Priority Data
Dec. 31, 2019  (CN) .......................... 201911408716.4

(51) Int. Cl.
*B61C 17/04*  (2006.01)
(52) U.S. Cl.
CPC .................................... *B61C 17/04* (2013.01)
(58) Field of Classification Search
CPC .................................................... B61C 17/04
See application file for complete search history.

(56) References Cited

U.S. PATENT DOCUMENTS

2010/0188025 A1*  7/2010  Adenau ................ H05B 47/184
345/55
2012/0004745 A1*  1/2012  Adenau ................ H05B 47/175
700/90

(Continued)

FOREIGN PATENT DOCUMENTS

CN          202400090 U      8/2012
CN          204038801 U  *  12/2014
(Continued)

OTHER PUBLICATIONS

English Translation of International Search Report from PCT/CN2020/133126 dated Feb. 26, 2021 (2 pages).

*Primary Examiner* — Jason C Smith
(74) *Attorney, Agent, or Firm* — Calfee, Halter & Griswold LLP

(57) ABSTRACT

The present disclosure discloses a driver console and a rail vehicle including the driver console. The driver console includes: a console body, a display screen, a control console, and a mechanical mechanism. The display screen is movable between a first position and a second position relative to the console body. The control console is movable between a third position and a fourth position relative to the console body. When the display screen is at the first position and the control console is at the third position, the driver console is in a manned state. When the display screen is at the second position and the control console is at the fourth position, the driver console is in an unmanned state. According to the driver console of the present disclosure, the manned state and the unmanned state can be effectively compatible with both the manned state and the unmanned state.

18 Claims, 13 Drawing Sheets

(56) References Cited

U.S. PATENT DOCUMENTS

| | | | | |
|---|---|---|---|---|
| 2017/0227210 A1* | 8/2017 | Cordes | ................ | H05B 47/165 |
| 2023/0041898 A1* | 2/2023 | Chen | ....................... | B61C 17/04 |
| 2024/0130805 A1* | 4/2024 | O'Quinn | ........ | A61B 17/320016 |

FOREIGN PATENT DOCUMENTS

| | | | | | |
|---|---|---|---|---|---|
| CN | 206615212 | U | | 11/2017 | |
| CN | 109177988 | A | | 1/2019 | |
| CN | 208638817 | U | * | 3/2019 | |
| CN | 208963065 | U | * | 6/2019 | |
| CN | 209667075 | U | | 11/2019 | |
| CN | 216943052 | U | * | 7/2022 | |
| DE | 102017220769 | A1 | | 6/2019 | |
| EP | 3294603 | B1 | | 9/2019 | |
| GB | 2530322 | A | * | 3/2016 | ............ A47B 19/00 |
| JP | 2006199156 | A | * | 8/2006 | |
| KR | 20100103071 | A | | 9/2010 | |

* cited by examiner

DRIVER CONSOLE AND RAIL VEHICLE INCLUDING SAME

CROSS-REFERENCE TO RELATED APPLICATIONS

This application is the U.S. National Stage of the PCT International Application No. PCT/CN2020/133126, filed on Dec. 1, 2020, which is based on and claims priority to Chinese Patent Application No. 201911408716.4, filed on Dec. 31, 2019. The entire content of the above-referenced application is incorporated herein by reference.

FIELD

The present disclosure relates to the field of driver controlling technologies, and more specifically, to a driver console and a rail vehicle including the same.

BACKGROUND

In the related art, rail vehicles may be manned or unmanned, and a structure state of a cab needs to meet a corresponding driving state. When a vehicle is in an unmanned state, a driver console control panel and a display screen control panel on a driver console need to be covered by a cover plate, and when an emergency situation needs to be handled by a driver, the cover plate needs to be opened to expose the driver console control panel and the display screen control panel. When the vehicle is in a manned state, the driver console control panel and the display screen control panel are always exposed. In this way, during switching between the manned state and the unmanned state, the driver needs to lift and close the cover plate. Such an operation is labor consuming, and the cover plate in the lifted-up state occupies more space in the cab. Therefore, this type of rail vehicle cannot be compatible with both the manned state and the unmanned state well and effectively.

SUMMARY

The present disclosure aims to resolve at least one of the technical problems existing in the related art. Therefore, the present disclosure provides a driver console, and the driver console can effectively be compatible with both a manned state and an unmanned state through movement of a display screen and a control console.

The present disclosure further provides a rail vehicle including the foregoing driver console.

According to a first aspect of the present disclosure, the driver console includes: a console body, including an accommodating space; a display screen, where the display screen is movable between a first position and a second position relative to the console body, at the first position, at least a display portion of the display screen is exposed to be in an available state, and at the second position, at least the display portion of the display screen is accommodated in the accommodating space to be in a non-available state; a control console, where the control console is movable between a third position and a fourth position relative to the console body, at the third position, at least a control portion of the control console is exposed to be in an available state, and at the fourth position, at least the control portion of the control console is accommodated in the accommodating space to be in a non-available state; and a mechanical mechanism, where the mechanical mechanism is configured to cause the display screen to be movable between the first position and the second position, and configured to cause the control console to be movable between the third position and the fourth position.

According to the driver console of the present disclosure, the manned state and the unmanned state can be effectively compatible with both the manned state and the unmanned state.

In some embodiments, the display screen is entirely accommodated in the accommodating space at the second position.

In some embodiments, the console body includes a horizontally placed console surface, and the accommodating space includes an upper opening formed on the horizontally placed console surface. At the second position, a front surface of the display screen faces downward and is accommodated in the accommodating space, and a back surface of the display screen fills in the upper opening.

In some embodiments, the mechanical mechanism includes a pivot component. The pivot component is configured to cause the display screen to be rotatable in a reciprocating manner around a first horizontal axis relative to the console body. At the first position, the display screen is at least partially moved out to above the upper opening, and the front surface of the display screen intersects with a horizontal plane to form an obtuse angle.

In some embodiments, the control console is entirely accommodated in the accommodating space at the fourth position.

In some embodiments, the console body includes a vertically placed console surface, and the accommodating space includes a rear opening formed on the vertically placed console surface. At the third position, the control console is at least partially moved to the rear of the rear opening. At the fourth position, the control console is entirely accommodated forward in the accommodating space.

In some embodiments, the mechanical mechanism includes a slide component. The slide component is configured to cause the control console to be translatable in a reciprocating manner in a front-rear direction relative to the console body.

In some embodiments, the mechanical mechanism includes a linkage apparatus. The linkage apparatus is constructed to: cause the control console to move to the third position while causing the display screen to move to the first position; and cause the control console to move to the fourth position while causing the display screen to move to the second position.

In some embodiments, the linkage apparatus is a first crank sliding block mechanism. The first crank sliding block mechanism includes: the pivot component, the slide component, and a link rod. The pivot component is configured to cause the display screen to be rotatable in a reciprocating manner around the first horizontal axis relative to the console body. The slide component is configured to cause the control console to be translatable in a reciprocating manner in a front-rear direction relative to the console body. One end of the link rod is rotatably connected with the display screen, and the other end of the link rod is rotatably connected with the control console.

In some embodiments, the first horizontal axis is located above the slide component. When the display screen is at the second position, the control console is located at the fourth position and below the display screen at the same time, and a top portion and a rear portion of the accommodating space are both opened.

In some embodiments, the driver console further includes a locking mechanism. The locking mechanism is switchable between a locked state and an unlocked state. In the locked state, the locking mechanism may lock the control console at the third position in the third position, and may locks the control console at the fourth position to the fourth position.

In some embodiments, the locking mechanism includes: a lock head and a second crank sliding block mechanism. The lock head is fixed to the console body and a locking hole is formed on the lock head. The second crank sliding block mechanism includes: a first crank, a first slide member, and a first connecting rod. A first end of the first crank is opposite to the locking hole and is rotatable around a longitudinal axis. The first slide member is configured to translate in a reciprocating manner in a vertical direction relative to the console body, and a lower end of the first slide member is configured to lock a first lock pin of the control console. One end of the first connecting rod is rotatably connected with a second end of the first crank, and the other end of the first connecting rod is rotatably connected with an upper end of the first slide member.

In some embodiments, the mechanical mechanism includes the slide component configured to cause the control console to translate in a reciprocating manner in a front-rear direction relative to the console body. The slide component includes a slide rail extending in a front-rear direction and a slider inserted in the slide rail and configured to slide in a front-rear direction. A rear end of the slide rail includes a first slot. A front end of the slider includes a second slot, and a rear end of the slider includes a third slot. At the third position, the first slot and the second slot are opposite to each other and are lockable by the first lock pin. At the fourth position, the first slot and the third slot are opposite to each other and are lockable by the first lock pin.

In some embodiments, the driver console further includes a baffle. The baffle is movable between a blocking position and an avoiding position. At the blocking position, the baffle covers the rear opening. At the avoiding position, the baffle avoids the rear opening.

In some embodiments, the driver console further includes a hinge. The hinge is connected between the baffle and the console body, to cause the baffle to be rotatable in a reciprocating manner around a second horizontal axis relative to the console body. The second horizontal axis is at a bottom side of or below the rear opening.

In some embodiments, the driver console further includes a locking mechanism. The locking mechanism is switchable between a locked state and an unlocked state. In the locked state, the locking mechanism may lock the baffle at the blocking position in the blocking position.

In some embodiments, in the locked state, the locking mechanism may lock the control console at the third position in the third position, and may lock the control console at the fourth position to the fourth position.

In some embodiments, the locking mechanism includes: a lock head and a third crank sliding block mechanism. The lock head is fixed to the console body and a locking hole is formed on the lock head. The third crank sliding block mechanism includes: a second crank, a second slide member, and a second connecting rod. A first end of the second crank is opposite to the locking hole and is rotatable around a longitudinal axis. The second slide member is configured to translate in a reciprocating manner in a horizontal direction relative to the console body, and an outer end of the second slide member is configured to lock a second lock pin of the baffle. One end of the second connecting rod is rotatably connected with a second end of the second crank, and the other end of the second connecting rod is rotatably connected with an inner end of the second slide member.

In some embodiments, the locking mechanism comprises a second crank sliding block mechanism. The second crank sliding block mechanism includes: a first crank, a first slide member, and a first connecting rod. A first end of the first crank and the first end of the second crank are configured to synchronously rotate around the longitudinal axis. The first slide member is configured to translate in a reciprocating manner in a vertical direction relative to the console body, and a lower end of the first slide member is configured to lock a first lock pin of the control console. One end of the first connecting rod is rotatably connected with a second end of the first crank, and the other end of the first connecting rod is rotatably connected with an upper end of the first slide member.

According to a second aspect of the present disclosure, the rail vehicle includes a cab and a driver console arranged in the cab. The driver console is the driver console according to the first aspect of the present disclosure. According to the rail vehicle of the present disclosure, both a manned state and an unmanned state can be effectively compatible with by arranging the driver console according to the first aspect.

Additional aspects and advantages of the present disclosure will be given in the following description, some of which will become apparent from the following description or may be learned from the practice of the present disclosure.

LIST OF REFERENCE NUMERALS

Figure 1:
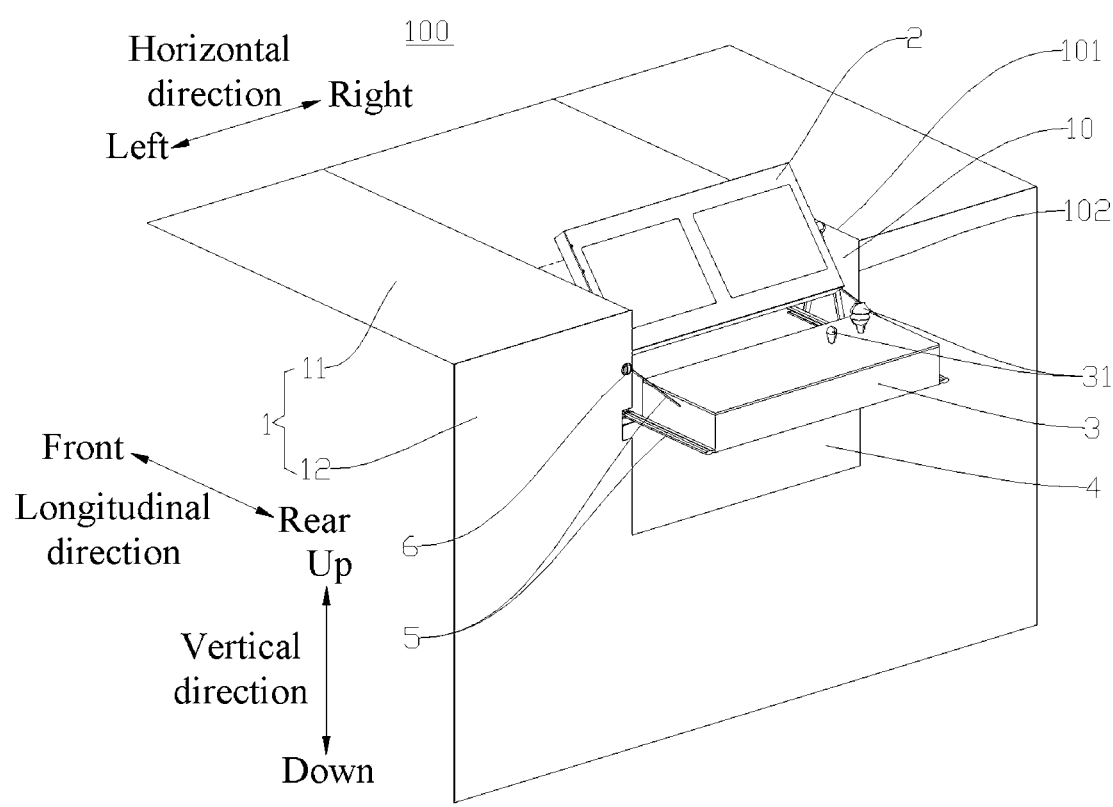
FIG. 1 is a schematic diagram of a driver console in a manned state according to an embodiment of the present disclosure.
Figure 2:
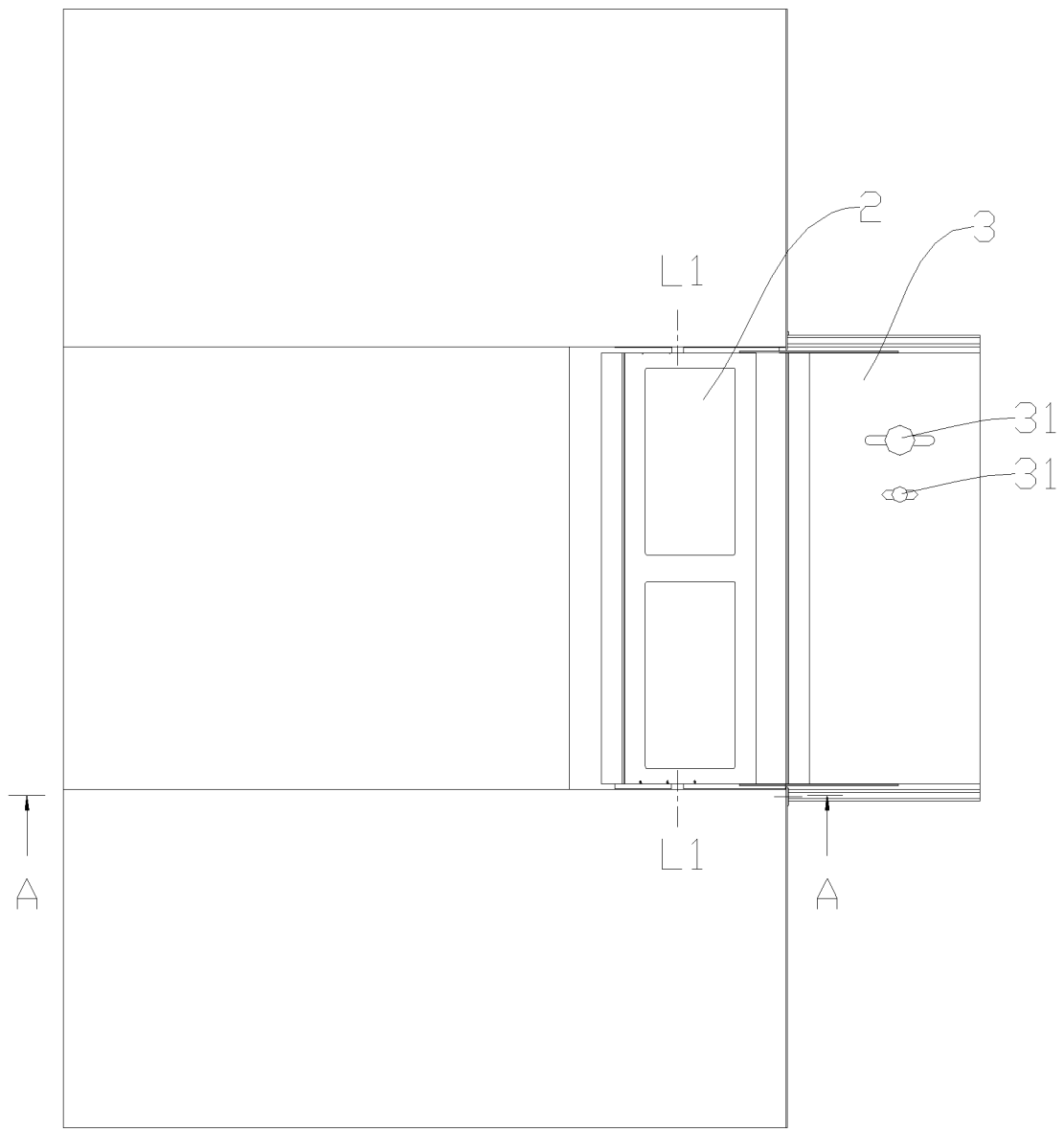
FIG. 2 is a top view of the driver console shown in FIG. 1.
Figure 3:
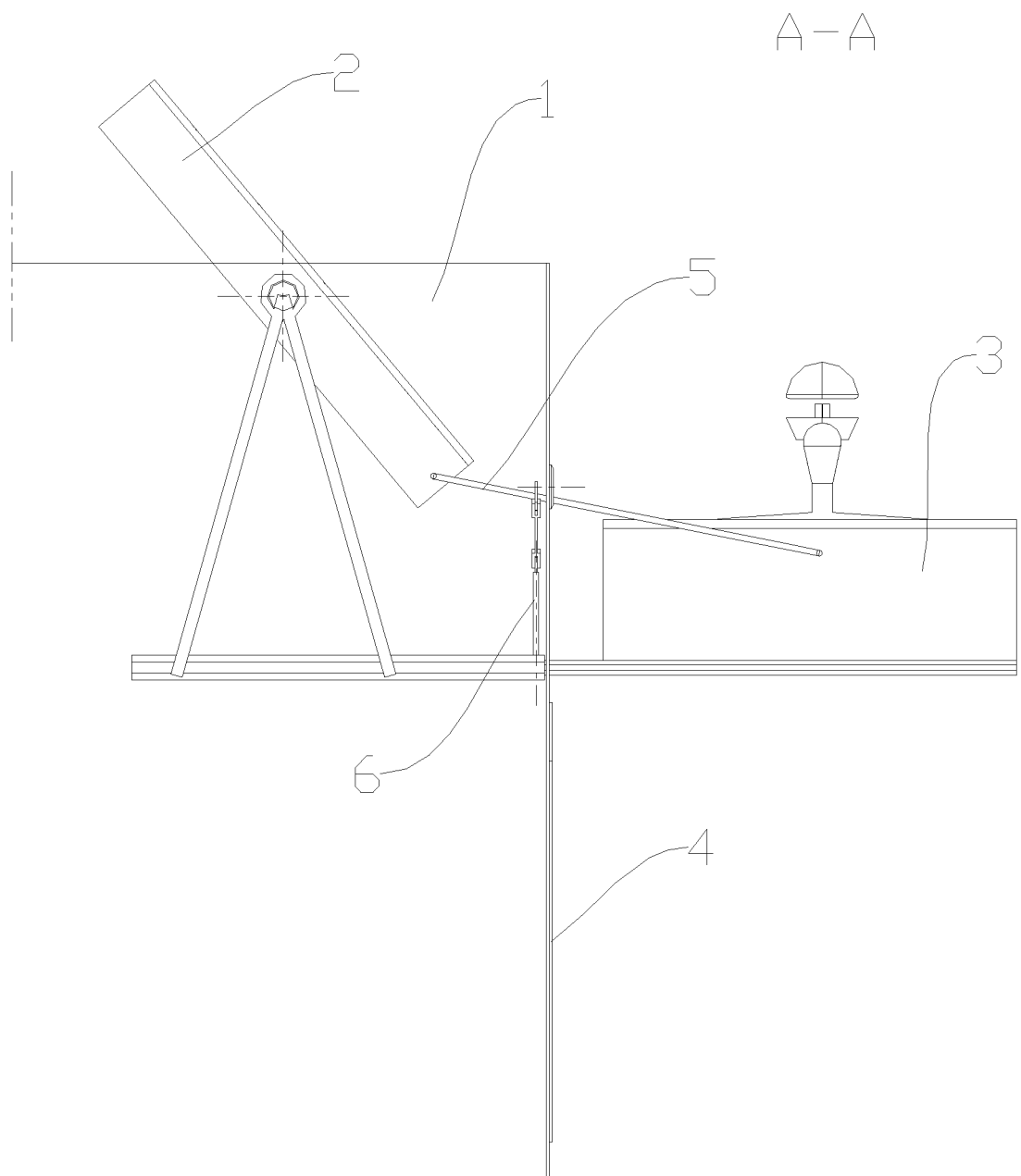
FIG. 3 is a cross-sectional view along a line A-A in FIG. 2.

Driver console 100;
First horizontal axis L1; Second horizontal axis L2; Longitudinal axis L3;
Console body 1; Horizontally placed console surface 11; Vertically placed console surface 12; Accommodating space 10; Upper opening 101; Rear opening 102;
Display screen 2; Front surface 21; Back surface 22;
Control console 3; Handle 31; Baffle 4;
Mechanical mechanism 5; First crank sliding block mechanism 51;
Pivot component 511; Holder 511a; Shaft hole 511b; Rotating shaft 511c;
Slide component 512; Slide rail 512a; Sliding groove 512a1; First slot 512a2;
Slider 512b; Second slot 512b1; Third slot 512b2;
Link rod 513;
Locking mechanism 6;
Lock head 61; Locking hole 610;
Second crank sliding block mechanism 62;
First crank 621; First end 621a of the first crank 621; Second end 621b of the first crank 621;
First slide member 622; First lock pin 6221; First connecting rod 623;
Third crank sliding block mechanism 63;
Second crank 631; First end 631a of the second crank 631; Second end 631b of the second crank 631;
Second slide member 632; Second lock pin 6321; Second connecting rod 633;
First guide structure 64; Second guide structure 65;
Hinge 7; Rail vehicle 1000; and Cab 200.

DETAILED DESCRIPTION

Embodiments of the present disclosure are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary, and are intended to explain the present disclosure and cannot be construed as a limitation to the present disclosure.

The disclosure below provides many different embodiments or examples for implementing different structures of the present disclosure. To simplify the disclosure of the present disclosure, the following describes components and settings of specific examples. Certainly, the components and settings are merely examples, and are not intended to limit the present disclosure. In addition, reference numerals and/or letters may be repeated in different examples in the present disclosure. Such repetitions are for simplification and clarity, which do not indicate relationships between the embodiments and/or settings discussed. In addition, the present disclosure provides examples of various specific processes and materials, but a person of ordinary skill in the art may be aware of the applicability of other processes and/or the use of other materials.

In the related art, rail vehicles may be manned or unmanned, and a structure state of a cab 200 needs to meet a corresponding driving state. When the vehicle is in an unmanned state, a driver console control panel (referred to as a control console for short) and a display screen control panel (referred to as a display screen for short) on a driver console need to be covered by a cover plate, and when an emergency situation needs to be handled by a driver, the cover plate needs to be opened to expose the driver console control panel and the display screen control panel. When the vehicle is in a manned state, the driver console control panel and the display screen control panel are always exposed. In this way, during switching between the manned state and the unmanned state, the driver needs to lift and close the cover plate. Such an operation is labor consuming, and the cover plate in the lifted-up state occupies more space in the cab. Therefore, the rail vehicle cannot be compatible with both the manned state and the unmanned state well and effectively.

Based on the above, the present disclosure provides a driver console 100 applicable to a rail vehicle 1000, to resolve at least one of the foregoing technical problems. However, it should be noted that, the driver console 100 according to the embodiments of the present disclosure is not limited to being applicable to the rail vehicle 1000 and may also be applicable to other transportation vehicles. In addition, to simplify the description, a "vertical direction" described in the following content refers to an up-down direction, a "longitudinal direction" refers to a front-rear direction, and a "horizontal direction" refers to a left-right direction.

The following describes the driver console 100 according to the embodiments of a first aspect of the present disclosure with reference to the accompanying drawings.

As shown in FIG. 1, the driver console 100 includes: a console body 1, a display screen 2, a control console 3, and a mechanical mechanism 5. The console body 1 includes an accommodating space 10. The display screen 2 is movable between a first position and a second position relative to the console body 1. The control console 3 is movable between a third position and a fourth position relative to the console body 1. The mechanical mechanism 5 is configured to cause the display screen 2 to be movable between the first position and the second position, and configured to cause the control console 3 to be movable between the third position and the fourth position.

Figure 6:
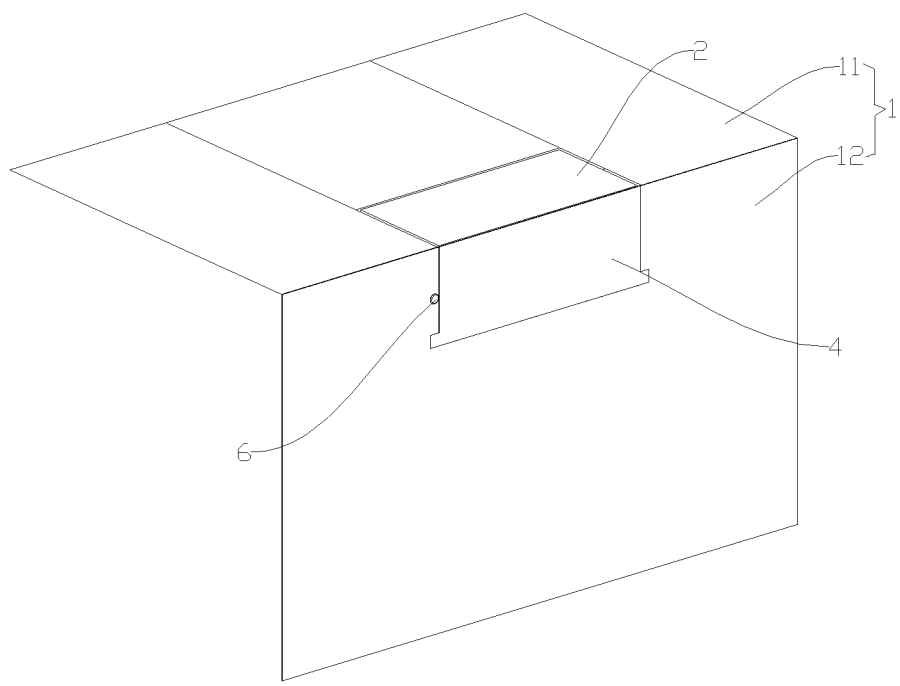
FIG. 6 is a schematic diagram of a driver console in an unmanned state according to an embodiment of the present disclosure.
Figure 7:
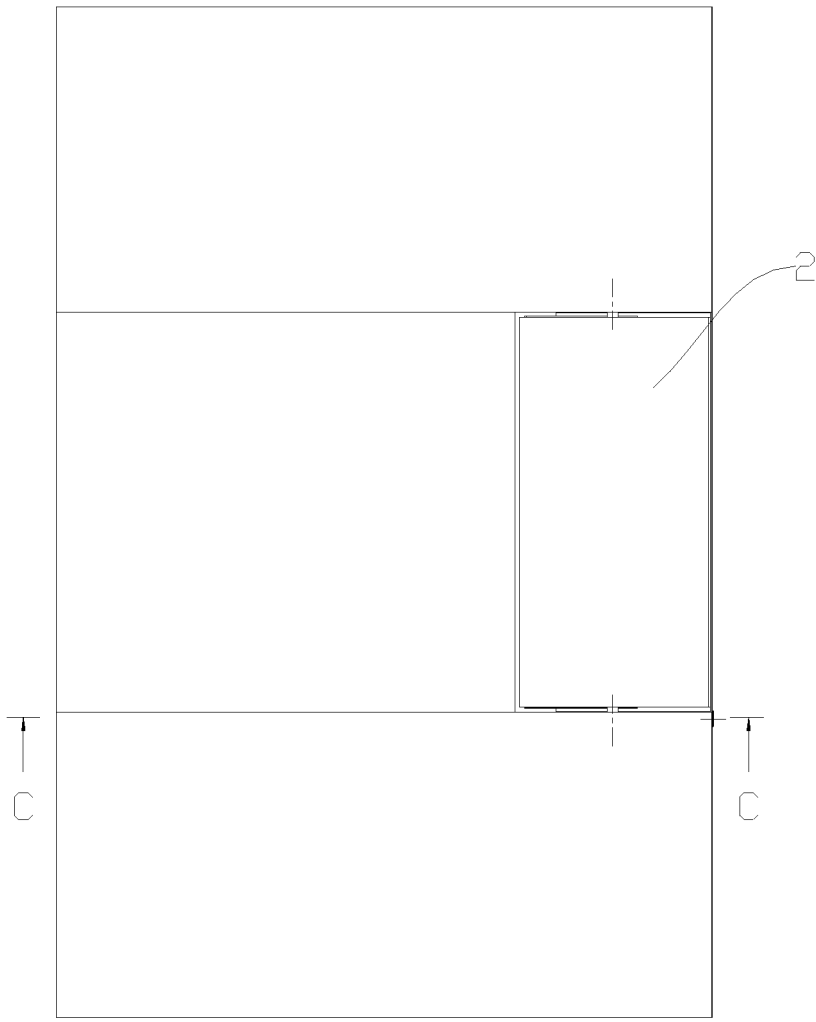
FIG. 7 is a top view of the driver console shown in FIG. 6.

As shown in FIG. 1, at the first position, at least a display portion of the display screen 2 is exposed to be in an available state. Namely, at the first position, the display portion is not blocked by any part of the console body 1 and can be observed or touched. In this case, the display portion can entirely be in the accommodating space 10 or may be at least partially moved out of the accommodating space 10, as long as the display portion is not blocked. As shown in FIG. 6, at the second position, at least the display portion of the display screen 2 is accommodated in the accommodating space 10 to be in a non-available state. Namely, at the second position, the display portion is accommodated in the accommodating space 10 and cannot be observed or touched. In addition, it should be noted that, the display screen 2 is not merely limited to having a display function, and for example, may further have display and touch functions.

As shown in FIG. 1, at the third position, at least a control portion of the control console 3 is exposed to be in an available state. Namely, at the third position, the control portion is not blocked by any part of the console body 1 and can be observed or touched. In this case, the control portion can entirely be in the accommodating space 10 or may be at least partially moved out of the accommodating space 10, as long as the control portion is not blocked. As shown in FIG. 6, at the fourth position, at least the control portion of the control console 3 is accommodated in the accommodating space 10 to be in a non-available state. Namely, at the fourth position, the control portion is accommodated in the accommodating space 10 and cannot be observed or touched. In addition, it should be noted that, a specific structure of the control console 3 is not limited, and for example, the control console may include at least one of a mechanical button, a touch button, or a handle.

Therefore, as shown in FIG. 1, when the display screen 2 is at the first position and the control console 3 is at the third position, the display screen 2 and the control console 3 are both in an available state, so that the driver console 100 can entirely be in a manned state. As shown in FIG. 6, when the display screen 2 is at the second position and the control console 3 is at the fourth position, the display screen 2 and the control console 3 are both in a non-available state, so that the driver console 100 can entirely be in an unmanned state.

Therefore, according to the driver console 100 of the embodiments of the present disclosure, both a manned state and an unmanned state can be effectively compatible with through movement of the display screen 2 and the control console 3. In addition, actions for lifting and closing the cover plate can be avoided, reducing labor costs, and there is no need to find an additional storage space for the lifted cover plate, reducing the space occupation rate by the cover plate in the cab 200. Besides, in the unmanned state, the display portion of the display screen 2 and the control portion of the control console 3 are both accommodated in the accommodating space 10, so that a probability of being mistakenly controlled can be reduced, and the privacy and appearance cleanliness can also be improved.

In some embodiments of the present disclosure, as shown in FIG. 6 to FIG. 11, at the second position, the display screen 2 is entirely accommodated in the accommodating space 10. Namely, no part of the display screen 2 is outside the accommodating space 10. Therefore, in the unmanned state, the display screen 2 does not occupy space outside the accommodating space 10, so that more space is saved in the cab 200, so as not to block the vision.

In some specific examples of the present disclosure, as shown in FIG. 1, the console body 1 includes a horizontally placed console surface 11. The horizontally placed console surface 11 is placed horizontally, but is not limited thereto. For example, the horizontally placed console surface may be placed horizontally or slightly obliquely to a horizontal plane. The horizontally placed console surface 11 may be a flat surface, an inclined surface, a folded surface, or a curved surface. The accommodating space 10 includes an upper opening 101 formed on the horizontally placed console surface 11. Referring to FIG. 6, at the second position, a front surface 21 of the display screen 2 faces downward and is accommodated in the accommodating space 10. It may be understood that, the display portion is formed on the front surface 21 of the display screen 2, and a back surface 22 of the display screen 2 fills in the upper opening 101. Namely, the back surface 22 of the display screen 2 and the horizontally placed console surface 11 around the upper opening 101 are in a smooth transition connection. Therefore, in the unmanned state, the display portion of the display screen 2 faces downward and can therefore be protected. In addition, the back surface 22 of the display screen 2 fills in the upper opening 101, so that the flatness of the horizontally placed console surface 11 can be improved, and the vision is not blocked by the display screen 2.

Figure 5:
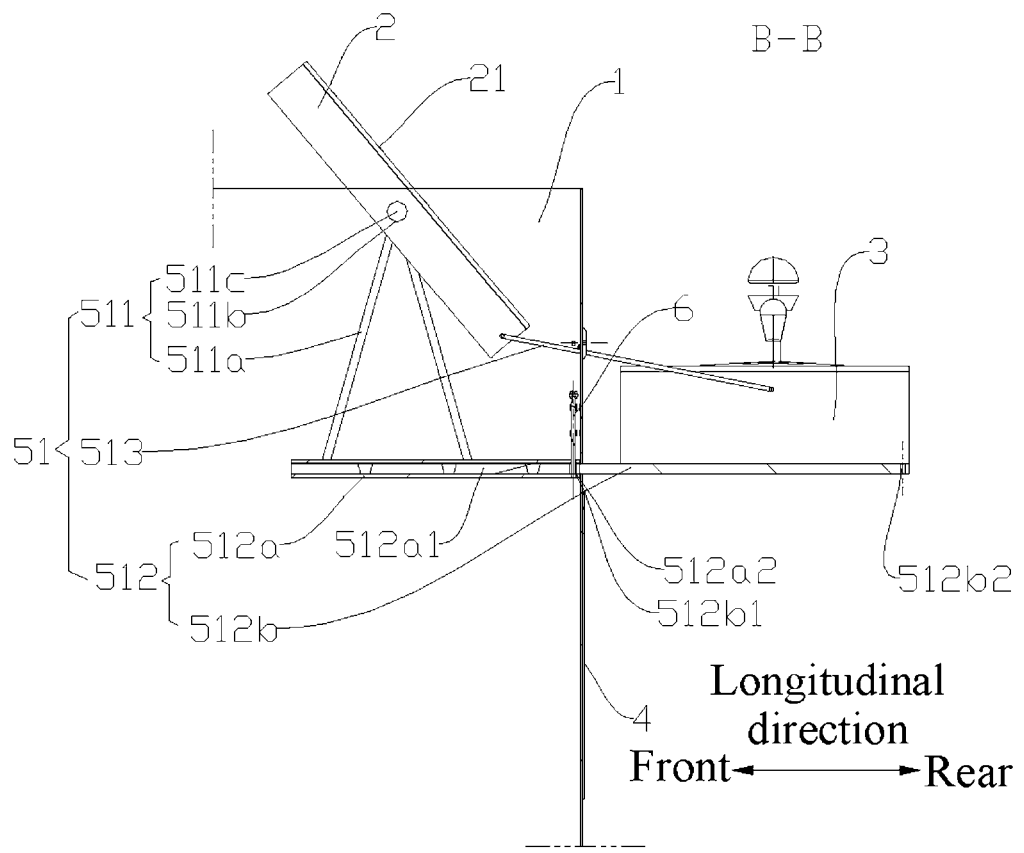
FIG. 5 is a cross-sectional view along a line B-B in FIG. 4.

As shown in FIG. 5, the mechanical mechanism 5 includes a pivot component 511. The pivot component 511 is configured to cause the display screen 2 to be rotatable in a reciprocating manner around a first horizontal axis L1 relative to the console body 1. An axis of the first horizontal axis L1 is arranged horizontally, but is not limited thereto.

The display screen 2 is configured to rotate in a reciprocating manner around the first horizontal axis L1 relative to the console body 1. At the first position, the display screen 2 is at least partially moved out to above the upper opening 101, and the front surface 21 of the display screen 2 intersects with a horizontal plane (the "horizontal plane" herein refers to a horizontal plane on a side of the display screen 2 close to a driver) to form an obtuse angle. Namely, the front surface 21 of the display screen 2 faces toward an upper rear portion, and the rear refers to a side of the console body 1 close to the driver.

Therefore, in the manned state, the front surface 21 of the display screen 2 intersects with the horizontal plane to form an obtuse angle, to better meet ergonomic design. The driver does not need to lower the head and can easily observe content displayed on the front surface 21 of the display screen 2 by merely looking down. Namely, in the manned state, the display portion of the display screen 2 can be easily observed by the driver. In addition, because the display screen 2 is configured for undergoing pivotal movement, actions of the display screen 2 are simple and fast and the driving force can be saved.

In some examples, as shown in FIG. 5, the first horizontal axis L1 may run through a center of the display screen 2, and the first horizontal axis L1 may be located below the horizontally placed console surface 11. In this way, at the first position, a part of the display screen 2 is moved out to above the upper opening 101, and another part is still in the accommodating space 10. In this case, movement of the display screen 2 occupies a little space outside the accommodating space 10 between the first position and the second position, thereby improving the structure compactness.

In some embodiments of the present disclosure, as shown in FIG. 6 to FIG. 11, at the fourth position, the control console 3 is entirely accommodated in the accommodating space 10. Namely, no part of the control console 3 is outside the accommodating space 10. Therefore, in the unmanned state, the control console 3 does not occupy space outside the accommodating space 10, so that more space is saved in the cab 200, so as not to block the vision.

In some specific examples of the present disclosure, as shown in FIG. 1, the console body 1 includes a vertically placed console surface 12. The vertically placed console surface 12 is placed vertically, but is not limited thereto. For example, the vertically placed console surface may be placed vertically or slightly obliquely to a vertical plane. The vertically placed console surface 12 may be a flat surface, an inclined surface, a folded surface, or a curved surface. The accommodating space 10 includes a rear opening 102 formed on the vertically placed console surface 12, where the rear refers to a side of the console body 1 close to the driver. As shown in FIG. 1, at the third position, at least the control portion of the control console 3 is moved to the rear of the rear opening 102. As shown in FIG. 6, at the fourth position, the control console 3 is entirely accommodated forward in the accommodating space 10. Therefore, in the manned state, the control portion of the control console 3 can be easily touched or controlled by the driver, and in the unmanned state, the control portion of the control console 3 is accommodated in the accommodating space 10 to be protected and prevented from being mistakenly touched, so that the driving safety can be improved, and more space is saved in the cab 200.

As shown in FIG. 5, the mechanical mechanism 5 includes a slide component 512. The slide component 512 is configured to cause the control console 3 to be translatable in a reciprocating manner in a front-rear direction relative to the console body 1. Because the control console 3 is configured for undergoing translational movement, actions of the control console 3 are simple and fast and require only a small driving force.

In some embodiments of the present disclosure, the mechanical mechanism 5 includes a linkage apparatus. The linkage apparatus is constructed to: cause the control console 3 to move to the third position while causing the display screen 2 to move to the first position, where the driver console 100 may be in the manned state in this case; and cause the control console 3 to move to the fourth position while causing the display screen 2 to move to the second position, where the driver console 100 may be in the unmanned state in this case. In view of the above, actions of the display screen 2 and the control console 3 are not independent of each other but are associated with each other, and there is no need to drive the display screen 2 and the control console 3 to move separately. Instead, while one of the display screen 2 and the control console 3 is driven to move, the other may be caused to move associatively, thereby saving a state switching time and improving the state switching efficiency.

For example, in a specific example of the present disclosure, as shown in FIG. 5, the linkage apparatus is a first crank sliding block mechanism 51. The first crank sliding block mechanism 51 includes: the pivot component 511, the slide component 512, and a link rod 513. The pivot component 511 is configured to cause the display screen 2 to be rotatable in a reciprocating manner around the first horizontal axis L1 (the axis of the first horizontal axis L1 is arranged horizontally, but is not limited thereto) relative to the console body 1. The slide component 512 is configured to cause the control console 3 to be translatable in a reciprocating manner in a front-rear direction relative to the console body 1. Two ends of the link rod 513 are rotatably connected with the display screen 2 and the control console 3 respectively (namely, one end of the link rod 513 is rotatably connected with the display screen 2, and the other end of the link rod 513 is rotatably connected with the control console 3). Therefore, the structure of the linkage apparatus is simple, which is easy to process and assemble and has high action reliability. During control, synchronous switching between the manned state and the unmanned state of the display screen 2 and the control console 3 may be implemented by rotating the display screen 2, or synchronous switching between the manned state and the unmanned state of the display screen 2 and the control console 3 may be implemented by pushing and pulling the control console 3, so that the switching is simple and fast.

Figure 8:
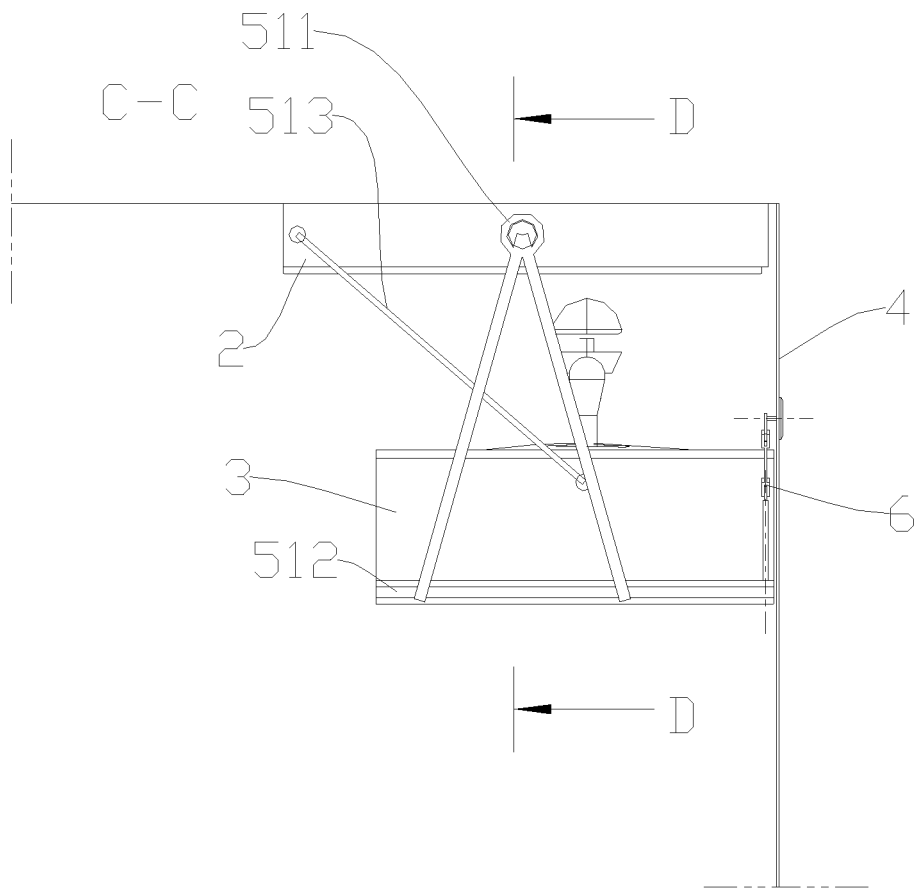
FIG. 8 is a cross-sectional view along a line C-C in FIG. 7.
Figure 9:
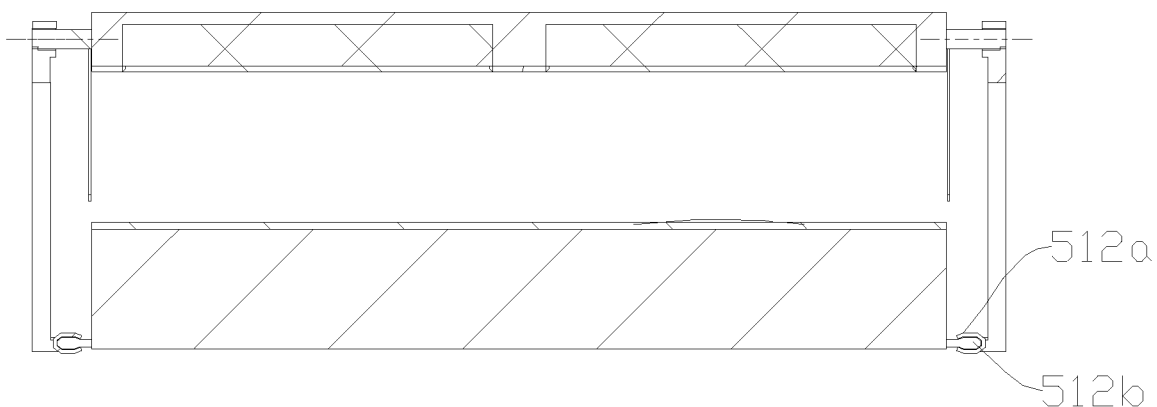
FIG. 9 is a cross-sectional view along a line D-D in FIG. 7.
Figure 10:
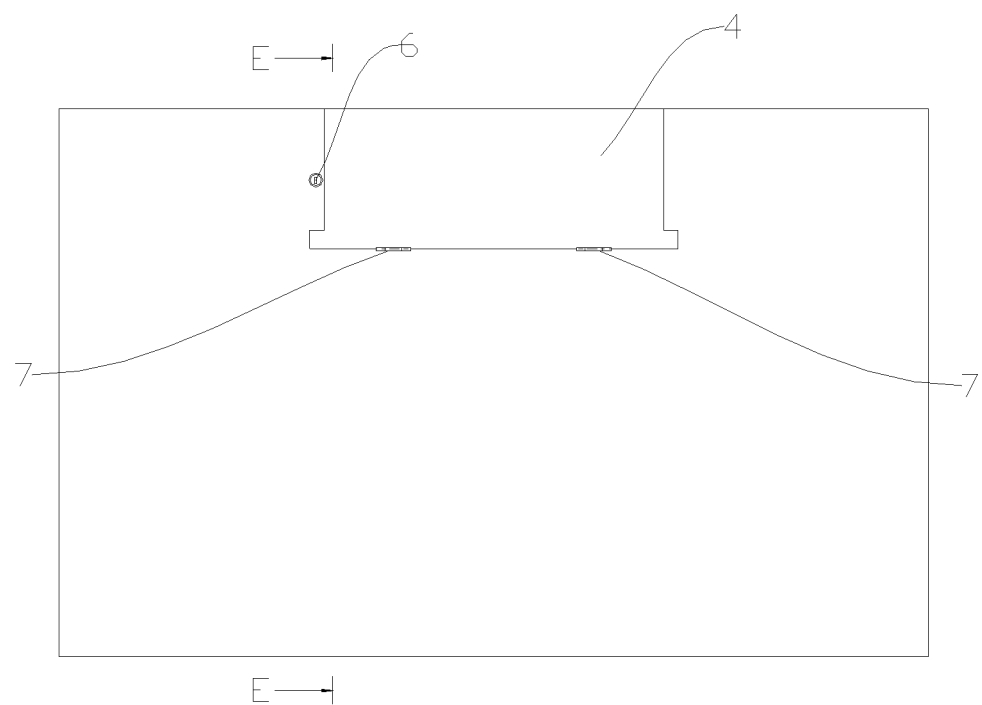
FIG. 10 is a front view of the driver console shown in FIG. 6.

In some embodiments of the present disclosure, as shown in FIG. 5, when the linkage apparatus is the first crank sliding block mechanism 51, the first horizontal axis L1 is above the slide component 512. Referring to FIG. 8, when the display screen 2 is at the second position, the control console 3 is at the fourth position and below the display screen 2 at the same time. Therefore, arrangement positions of the display screen 2 and the control console 3 better meet ergonomics, which facilitates control and observation by the driver. In addition, it should be noted that, in this embodiment, if the console body 1 includes the horizontally placed console surface 11 and the vertically placed console surface 12, and the accommodating space 10 includes the upper opening 101 formed on the horizontally placed console surface 11 and the rear opening 102 formed on the vertically placed console surface 12, the upper opening 101 may run backward through the console body 1, and the rear opening 102 may run upward through the console body 1. Therefore, a rear end of the upper opening 101 and an upper end of the rear opening 102 are connected, to open a top portion and a rear portion of the accommodating space 10, thereby ensuring that the first crank sliding block mechanism 51 can act reliably.

It should be noted that, in the foregoing embodiments of the present disclosure, there may be multiple structures of the "pivot component 511" in "the pivot component 511 is configured to cause the display screen 2 to be rotatable in a reciprocating manner around the first horizontal axis L1 relative to the console body 1". For example, in the example shown in FIG. 5, the pivot component 511 may include a holder 511a, a shaft hole 511b, and a rotating shaft 511c. There are two holders 511a arranged on two lateral sides of the display screen 2. The shaft hole 511b is formed on an upper portion of each holder 511a. The rotating shaft 511c is provided at a length middle position of each of the two lateral sides of the display screen 2. The rotating shaft 511c is rotatably inserted in the shaft hole 511b on the corresponding side, and a central axis of the rotating shaft 511c is the first horizontal axis L1. Certainly, the present disclosure is not limited thereto. For example, positions of the shaft hole 511b and the rotating shaft 511c may be interchangeable. In another example, the rotating shaft 511c may not be arranged at the length middle position of each of the two lateral sides of the display screen 2.

It should be noted that, in the foregoing embodiments of the present disclosure, there may be multiple structures of the "slide component 512" in "the slide component 512 is configured to cause the control console 3 to be translatable in a reciprocating manner in a front-rear direction relative to the console body 1". For example, in the example shown in FIG. 5, the slide component 512 may include a slide rail 512a and a slider 512b. There are two slide rails 512a arranged on two lateral sides of the control console 3. A sliding groove 512a1 extending in a front-rear direction is formed in each slide rail 512a. Bottoms of the two lateral sides of the control console 3 respectively have a slider 512b extending in a front-rear direction. Each slider 512b is slidably inserted in the sliding groove 512a1 in the slide rail 512a on the corresponding side in a front-rear direction. Certainly, the present disclosure is not limited thereto. For example, positions of the slide rail 512a and the slider 512b may be interchangeable. In another example, the slider 512b may alternatively not be arranged at the bottom position of each of the two sides of the display screen 2.

It should be noted that, in the foregoing embodiments of the present disclosure, connection positions of the two ends of the link rod 513 are not limited and need to be selected according to specific positions of the display screen 2 and the control console 3, positions of the pivot component 511 and the slide component 512, and the like. For example, in the foregoing example, when the first horizontal axis L1 is above the slide component 512, the display screen 2 is at the second position, and the control console 3 is at the fourth position and below the display screen 2, there may be two link rods 513 respectively arranged on the two lateral sides of the control console 3, a lower end of the link rod 513 is hinged to an upper portion of a length middle position on each of the two lateral sides of the control console 3, and an upper end of the link rod 513 is hinged to a length end on each of the two lateral sides of the display screen 2.

In some embodiments of the present disclosure, in a case that the mechanical mechanism 5 includes the linkage apparatus, namely, when the display screen 2 moves to the first position, the control console 3 moves to the third position at the same time; and when the display screen 2 moves to the second position, the control console 3 moves to the fourth position at the same time. The driver console 100 may further include a locking mechanism 6. The locking mechanism 6 is switchable between a locked state and an unlocked state. In the locked state, the locking mechanism 6 may locks the control console 3 at the third position in the third position. In this case, through the linkage apparatus, the display screen 2 is locked to the first position at the same time, so that the driver console can be in a stable manned state. In the locked state, the locking mechanism 6 may further lock the control console 3 at the fourth position to the fourth position. In this case, through the linkage apparatus, the display screen 2 is locked to the second position at the same time, so that the driver console can be in a stable unmanned state.

Figure 12:
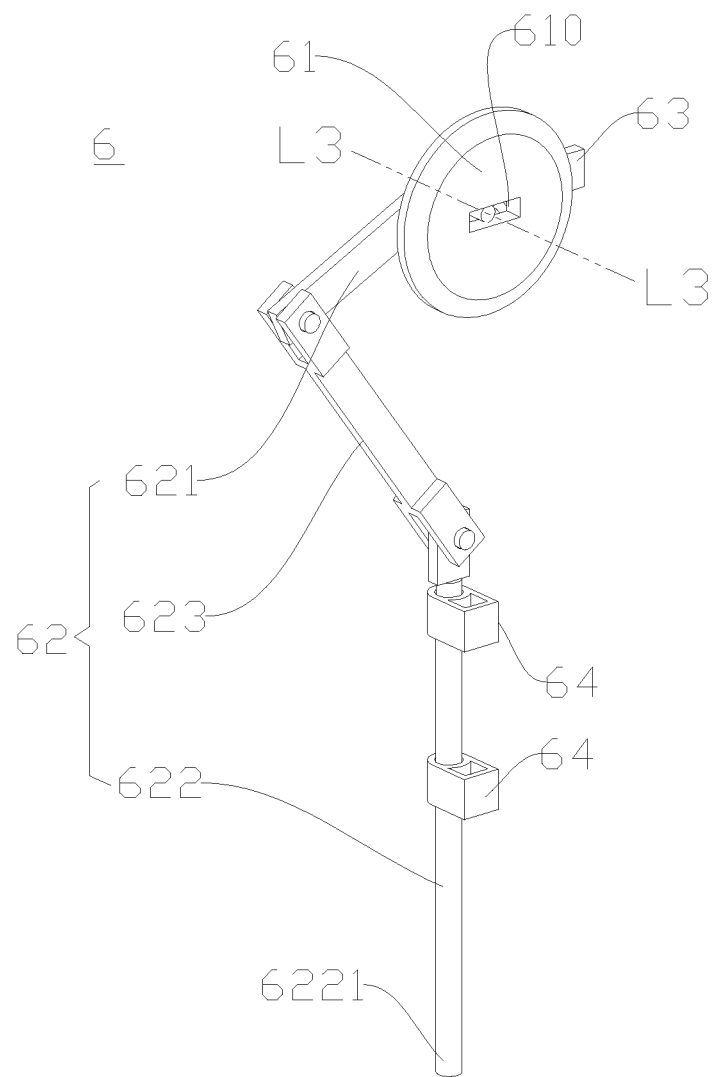
FIG. 12 is a three-dimensional view of a locking mechanism according to an embodiment of the present disclosure.
Figure 13:
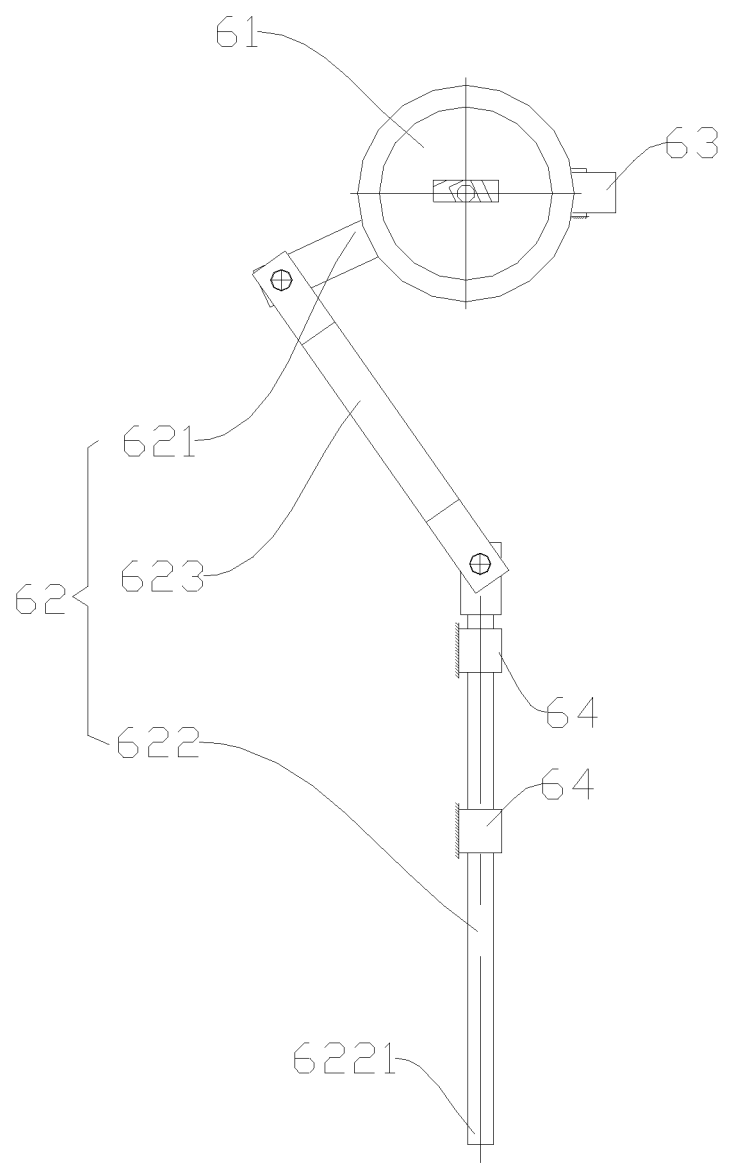
FIG. 13 is a front view of the locking mechanism shown in FIG. 12.
Figure 14:
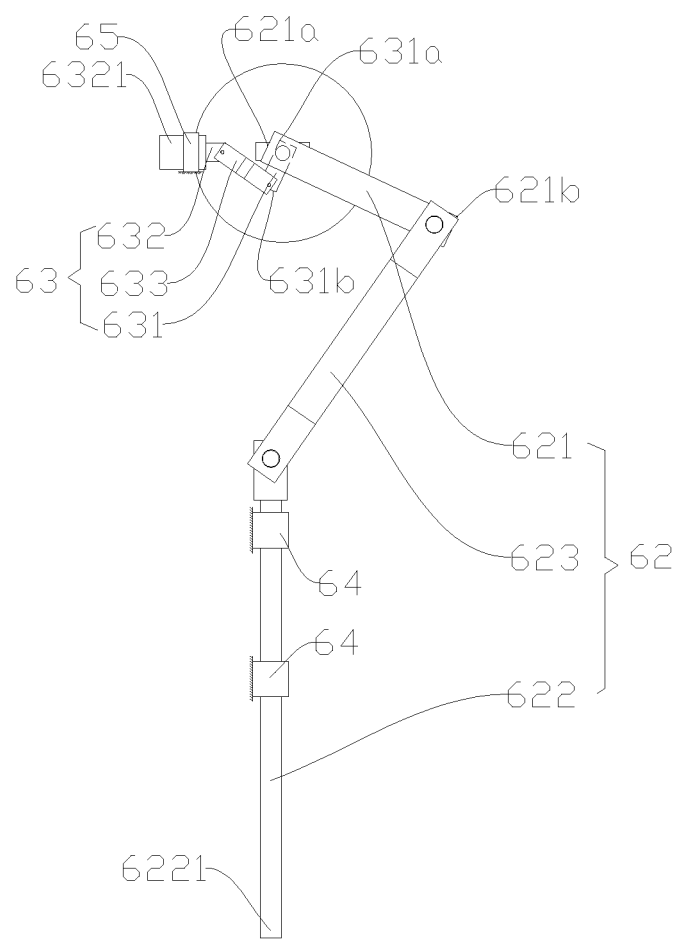
FIG. 14 is a rear view of the locking mechanism shown in FIG. 12.
Figure 15:
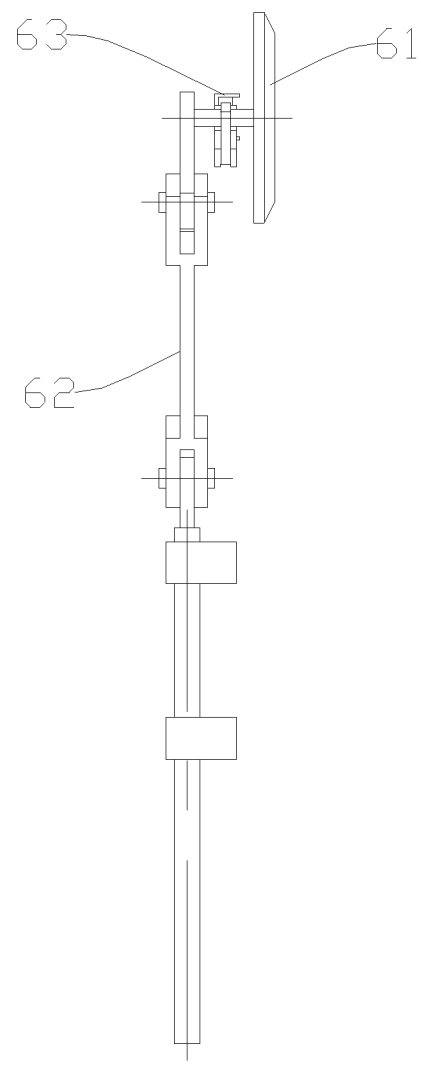
FIG. 15 is a left view of the locking mechanism shown in FIG. 12.

In some embodiments, as shown in FIG. 12 to FIG. 14, the locking mechanism 6 may include: a lock head 61 and a second crank sliding block mechanism 62. The lock head 61 is fixed to the console body 1 and a locking hole 610 is formed on the lock head 61. The second crank sliding block mechanism 62 includes: a first crank 621, a first slide member 622, and a first connecting rod 623. A first end 621a of the first crank 621 is opposite to the locking hole 610 and is rotatable around a longitudinal axis L3. The first slide member 622 is configured to translate in a reciprocating manner in a vertical direction relative to the console body 1, and a lower end of the first slide member 622 is configured to lock a first lock pin 6221 of the control console 3. Two ends of the first connecting rod 623 are respectively rotatably connected with a second end 621b of the first crank 621 and an upper end of the first slide member 622 (namely, one end of the first connecting rod 623 is rotatably connected with the second end 621b of the first crank 621, and the other end of the first connecting rod 623 is rotatably connected with the upper end of the first slide member 622). Therefore, the structure of the locking mechanism 6 is simple, and lock and unlock actions can be completed simply and effectively.

Figure 11:
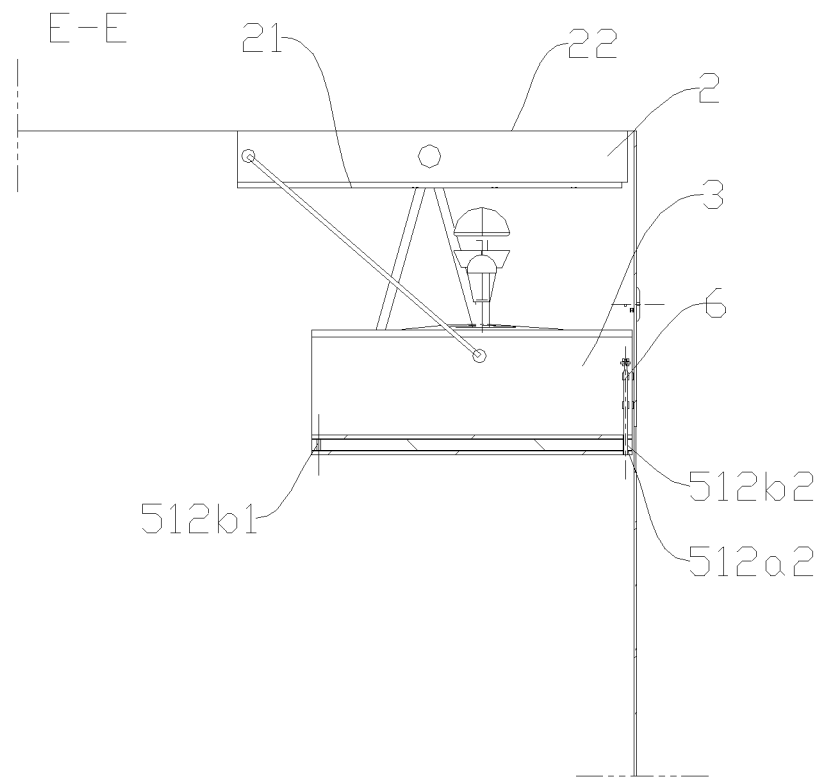
FIG. 11 is a cross-sectional view along a line E-E in FIG. 10.

In some specific examples, as shown in FIG. 5, the mechanical mechanism 5 includes the slide component 512 configured to cause the control console 3 to translate in a reciprocating manner in a front-rear direction relative to the console body 1. The slide component 512 includes a slide rail 512a extending in a front-rear direction and a slider 512b inserted in the slide rail 512a and configured to slide in a front-rear direction. A rear end of the slide rail 512a includes a first slot 512a2. A front end and a rear end of the slider 512b respectively include a second slot 512b1 and a third slot 512b2 (namely, the front end of the slider 512b includes the second slot 512b1, and the rear end of the slider 512b includes the third slot 512b2). As shown in FIG. 5, at the third position, the first slot 512a2 and the second slot 512b1 are opposite to each other and are lockable by the first lock pin 6221. As shown in FIG. 11, at the fourth position, the first slot 512a2 and the third slot 512b2 are opposite to each other and are lockable by the first lock pin 6221. Therefore, locking can be implemented simply and effectively.

When "the console body 1 includes a vertically placed console surface 12, the accommodating space 10 includes a rear opening 102 formed on the vertically placed console surface 12, at the third position, at least the control portion of the control console 3 is moved out of the rear opening 102 to the rear of the rear opening 102, and at the fourth position, the control console 3 is entirely accommodated in the accommodating space 10", the driver console 100 may further include a baffle 4, and the baffle 4 is movable between a blocking position and an avoiding position. As shown in FIG. 6, at the blocking position, the baffle 4 covers the rear opening 102. In the unmanned state, the baffle 4 can protect components in the accommodating space 10 and prevent foreign objects from entering the accommodating space 10, thereby ensuring the appearance integrity of the driver console 100. As shown in FIG. 1, at the avoiding position, the baffle 4 avoids the rear opening 102, to ensure that the control console 3 is moved backward out of the rear opening 102.

Figure 4:
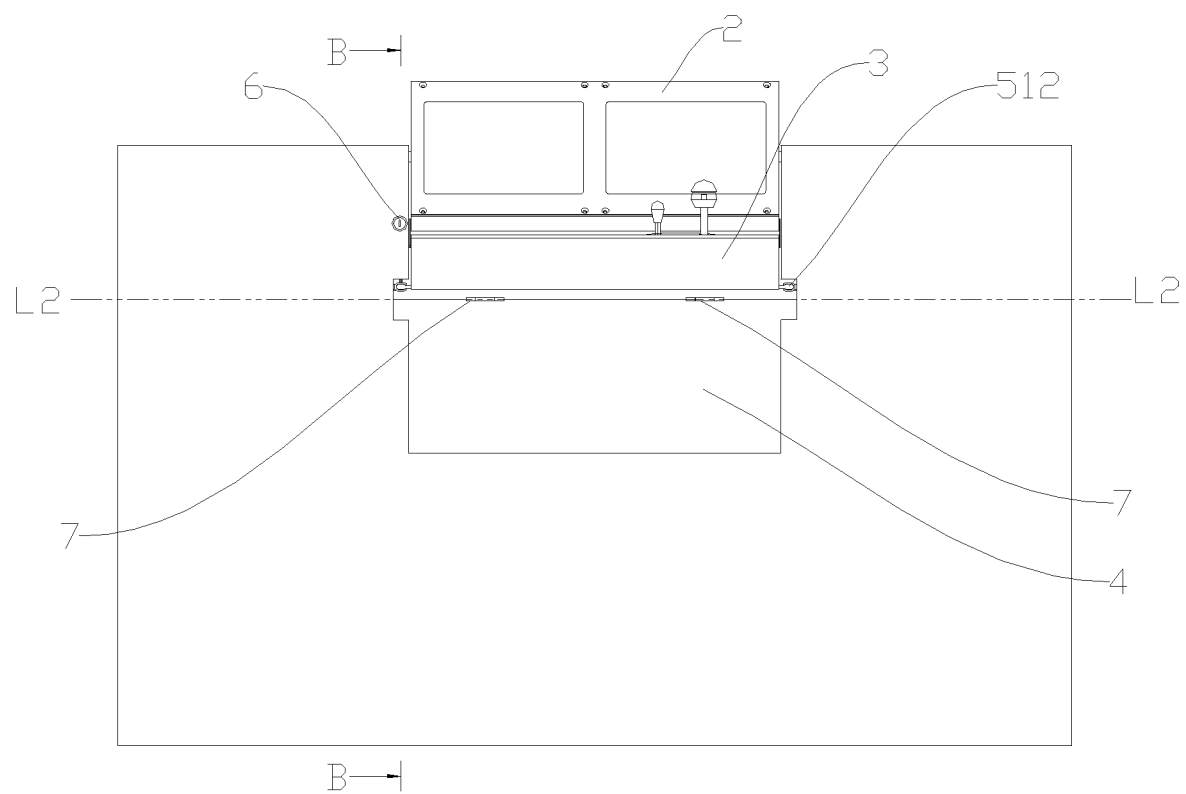
FIG. 4 is a front view of the driver console shown in FIG. 1.

In some embodiments of the present disclosure, as shown in FIG. 4, the driver console 100 may further include a hinge 7. The hinge 7 is connected between the baffle 4 and the console body 1, so that the baffle 4 is rotatable in a reciprocating manner around a second horizontal axis L2 relative to the console body 1. The second horizontal axis L2 is at a bottom side of or below the rear opening 102 (an axis of the second horizontal axis L2 is arranged horizontally, but is not limited thereto). Therefore, the baffle 4 can reach the blocking position by turning upward (as shown in FIG. 6), and the baffle 4 can reach the avoiding position by turning downward (as shown in FIG. 1), so that actions of the baffle 4 are simple and fast and require a small driving force. It should be noted that, the number of the hinges 7 is not limited, and there may be one or more hinges.

In some embodiments of the present disclosure, the driver console 100 may further include a locking mechanism 6. The locking mechanism 6 is switchable between a locked state and an unlocked state. Referring to FIG. 6, in the locked state, the locking mechanism 6 can lock the baffle 4 at the blocking position to the blocking position, to ensure that the baffle 4 can stay at the blocking position stably. Therefore, the reliability that the baffle 4 is at the blocking position can be ensured.

For example, in the specific examples shown in FIG. 12 to FIG. 14, the locking mechanism 6 may include: a lock head 61 and a third crank sliding block mechanism 63. The lock head 61 is fixed to the console body 1 and a locking hole 610 is formed on the lock head 61. The third crank sliding block mechanism 63 includes: a second crank 631, a second slide member 632, and a second connecting rod 633. A first end 631a of the second crank 631 is opposite to the locking hole 610 and is rotatable around a longitudinal axis L3. The second slide member 632 is configured to translate in a reciprocating manner in a horizontal direction relative to the console body 1, and an outer end of the second slide member 632 is configured to lock a second lock pin 6321 of the baffle 4. Two ends of the second connecting rod 633 are respectively rotatably connected with a second end 631b of the second crank 631 and an inner end of the second slide member 632 (namely, one end of the second connecting rod 633 is rotatably connected with the second end 631b of the second crank 631, and the other end of the second connecting rod 633 is rotatably connected with the inner end of the second slide member 632). Therefore, a key may be inserted in the locking hole 610, to rotate the first end 631a of the second crank 631. During rotation of the second crank 631, the second slide member 632 may be pulled by the second connecting rod 633 to slide in a reciprocating manner in a horizontal direction, to implement locking and unlocking of the second lock pin 6321. It may be understood that, the locking mechanism 6 further includes a second guide structure 65 configured to limit the second slide member 632 from sliding in a reciprocating manner in a horizontal direction.

Further, the locking mechanism 6 may be further constructed to: in the locked state, lock the control console 3 at the third position in the third position, and lock the control console 3 at the fourth position to the fourth position.

Namely, in addition to the function of locking the baffle 4, the locking mechanism 6 further includes a function of locking the control console 3, so that multiple locking effects can be achieved by using one locking mechanism 6, thereby improving the reliability of the driver console 100 after state switching and simplifying the entire structure of the driver console 100.

For example, in the specific examples shown in FIG. 12 to FIG. 15, the locking mechanism 6 may include a second crank sliding block mechanism 62. The second crank sliding block mechanism 62 includes: a first crank 621, a first slide member 622, and a first connecting rod 623. A first end 621*a* of the first crank 621 and the first end 631*a* of the second crank 631 are configured to synchronously rotate around the longitudinal axis L3. The first slide member 622 is configured to translate in a reciprocating manner in a vertical direction relative to the console body 1, and a lower end of the first slide member 622 is configured to lock a first lock pin 6221 of the control console 3. Two ends of the first connecting rod 623 are respectively rotatably connected with a second end 621*b* of the first crank 621 and an upper end of the first slide member 622 (namely, one end of the first connecting rod 623 is rotatably connected with the second end 621*b* of the first crank 621, and the other end of the first connecting rod 623 is rotatably connected with the upper end of the first slide member 622).

Therefore, a key may be inserted in the locking hole 610, to directly or indirectly rotate the first end 621*a* of the first crank 621. During rotation of the first crank 621, the first slide member 622 may be pulled by the first connecting rod 623 to slide in a reciprocating manner in a vertical direction, to implement locking and unlocking of the first lock pin 6221. It may be understood that, the locking mechanism 6 further includes a first guide structure 64 configured to limit the first slide member 622 from sliding in a reciprocating manner in a vertical direction.

It may be understood that, there are multiple implementations for synchronously rotating the first end 631*a* of the second crank 631 and the first end 621*a* of the first crank 621. For example, the first end 631*a* of the second crank 631 and the first end 621*a* of the first crank 621 may be engaged through a non-circular surface, or the first end 631*a* of the second crank 631 and the first end 621*a* of the first crank 621 are engaged with a key at the same time. Certainly, the present disclosure is not limited thereto, and the locking mechanisms 6 (the locking mechanism 6 configured to lock the baffle 4 and the locking mechanism 6 configured to lock the control console 3) in the foregoing two embodiments may alternatively be different locking mechanisms. In this case, different keys need to be used to drive the third crank sliding block mechanism 63 and the second crank sliding block mechanism 62 respectively, to implement independent locking and unlocking of the second lock pin 6321 and the first lock pin 6221 separately.

In some embodiments of the present disclosure, the mechanical mechanism 5 includes the slide component 512 configured to cause the control console 3 to translate in a reciprocating manner in a front-rear direction relative to the console body 1. The slide component 512 includes a slide rail 512*a* extending in a front-rear direction and a slider 512*b* inserted in the slide rail 512*a* and configured to slide in a front-rear direction. A rear end of the slide rail 512*a* includes a first slot 512*a*2. A front end and a rear end of the slider 512*b* respectively include a second slot 512*b*1 and a third slot 512*b*2. As shown in FIG. 5, at the third position, the first slot 512*a*2 and the second slot 512*b*1 are opposite to each other and are lockable by the first lock pin 6221. As shown in FIG. 11, at the fourth position, the first slot 512*a*2 and the third slot 512*b*2 are opposite to each other and are lockable by the first lock pin 6221. Therefore, locking of the position of the control console 3 can be implemented simply and effectively.

The following describes a rail vehicle 1000 according to embodiments of a second aspect of the present disclosure.

Figure 16:
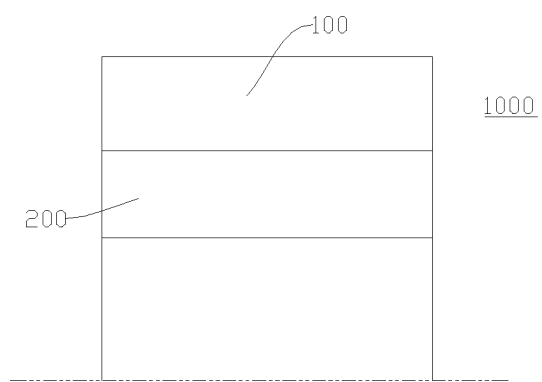
FIG. 16 is a schematic diagram of a rail vehicle according to an embodiment of the present disclosure.

As shown in FIG. 16, the rail vehicle 1000 according to the embodiments of the present disclosure includes a cab 200, and the driver console 100 according to the embodiments of the first aspect of the present disclosure is arranged in the cab 200. It should be noted that, a specific type of the rail vehicle 1000 according to the embodiments of the present disclosure is not limited, for example, may be a light rail train, a subway train, a railway train, or the like. In addition, the driver console 100 according to the embodiments of the present disclosure is not limited to being applicable to the rail vehicle 1000, and may be arranged in any transportation vehicles (for example, a car, a bus, a ship, or an airplane) according to an actual requirement or applicable to other related fields requiring switching between a manned state and an unmanned state.

Other configurations of the rail vehicle 1000 according to the embodiments of the present disclosure and functions and controls of the driver console 100 are known to a person of ordinary skill in the art and will not be described in detail herein. In addition, it should be noted that, action manners and relative arrangement positions of the display screen 2, the control console 3, and the baffle 4 according to the embodiments of the present disclosure are not limited to the foregoing description. For example, in some embodiments, the mechanical mechanism 5 may further include a lifting component, and the display screen 2 can perform lifting movement in an up-down direction under the action of the lifting component. The mechanical mechanism 5 may further include a swing component, and the control console 3 is pivotally swingable around a horizontal axis under the action of the swing component. The baffle 4 may further translate in a horizontal or vertical direction through a translation component. The control console 3 may alternatively not be below the display screen 2. For example, the control console 3 may alternatively be arranged on a lateral side of the display screen 2, which is not described in detail herein.

The following describes a driver console 100 and a rail vehicle 1000 including the driver console according to a specific embodiment of the present disclosure with reference to FIG. 1 to FIG. 16.

The driver console 100 is mounted on a front end in the cab 200 through a support skeleton. The console body 1 of the driver console 100 includes a horizontally placed console surface 11 that is placed horizontally and a vertically placed console surface 12 that is placed vertically. The horizontally placed console surface 11 and the vertically placed console surface 12 are both made of a glass fiber, but are not limited thereto. Glass fiber reinforced plastic covers on left and right sides of the console body 1 are connected with wall panels on left and right sides of the cab 200. A lower end of the vertically placed console surface 12 is connected with the floor of the cab 200. A front end of the horizontally placed console surface 11 is connected with a front windshield. The driver console 100 can compatible with both an unmanned state and a manned state.

In the unmanned state, the control console 3 is pushed into the accommodating space 10 of the console body 1. The baffle 4 is turned upward around a fixing hinge 7 thereof. The baffle 4 and the control console 3 are locked by the locking mechanism 6. The display screen 2 is placed horizontally and a screen thereof faces downward. The control console 3 and the display screen 2 are both accommodated in the accommodating space 10. When no key unlocks the locking mechanism 6, the control console 3 and the display screen 2 cannot be moved out, and control cannot be implemented.

In the manned state, the driver inserts a key to unlock the locking mechanism 6, turns the baffle 4 downward around the fixing hinge 7 thereof, and then pulls the control console 3 (for example, pulls a handle 31 on the control console 3) to pull out the control console 3. The control console 3 drives, through the link rod 513, the display screen 2 to rotate around the first horizontal axis L1 running through a center of the display screen, so that the screen of the display screen 2 forms an inclination angle of 130° with a horizontal plane. The driver then controls the locking mechanism 6 by using the key, and locks the control console 3 to the position through the locking mechanism 6, so that the driver can reliably control the control console 3 and observe the display screen 2.

The display screen 2 and the control console 3 may be connected with each other through the mechanical mechanism 5, and the structure of the mechanical mechanism 5 may be as follows: the display screen 2 is rotatably supported on an upper end of the holder 511*a* around an axis running through the center of the display screen in a left-right direction, a lower end of the holder 511*a* is rigidly connected with the slide rail 512*a*, a lower end of the control console 3 includes the slider 512*b* configured to slide in a front-rear direction and be engaged with the slide rail 512*a*, and the two ends of the link rod 513 are respectively rotatably connected with the display screen 2 and the control console 3 around axes. Therefore, the display screen 2 may be equivalent to a driven mechanism in a crank sliding block mechanism, the control console 3 may be equivalent to a driving mechanism in the crank sliding block mechanism, and the display screen and the control console are combined into the first crank sliding block mechanism 51 through the link rod 513.

In the unmanned state, the key is rotated counterclockwise. The second slide member 632 is driven to slide horizontally rightward through rotation of the second crank 631 in the third crank sliding block mechanism 63 and the second connecting rod 633. The second lock pin 6321 on the second slide member 632 is horizontally inserted in a lock box on the baffle 4. The first slide member 622 is driven to slide downward through rotation of the first crank 621 in the second crank sliding block mechanism 62 and the first connecting rod 623. The first lock pin 6221 on the first slide member 622 is inserted downward in the first slot 512*a*2 and the third slot 512*b*2, to maintain the control console 3 and the display screen 2 in the unmanned state.

When the manned state is required, the key is first rotated clockwise. The second slide member 632 is driven to slide horizontally leftward through rotation of the second crank 631 in the third crank sliding block mechanism 63 and the second connecting rod 633. The second lock pin 6321 on the second slide member 632 is pulled horizontally leftward out of the lock box on the baffle 4. The first slide member 622 is driven to slide upward through rotation of the first crank 621 in the second crank sliding block mechanism 62 and the first connecting rod 623. The first lock pin 6221 on the first slide member 622 is pulled upward out of the first slot 512*a*2 and the third slot 512*b*2. The baffle 4 is then turned downward and the control console 3 is pulled out. The key is then rotated counterclockwise. The first slide member 622 is driven to slide downward through rotation of the first crank 621 in the second crank sliding block mechanism 62 and the first connecting rod 623. The first lock pin 6221 on the first slide member 622 is inserted downward in the first slot 512*a*2 and the second slot 512*b*1, to maintain the control console 3 and the display screen 2 in the manned state.

Based on the above, the driver console 100 according to some embodiments of the present disclosure may include at least one of the following advantages:

(1) Both the manned state and the unmanned state can be compatible with simply and effectively, and switching between the two states is simple, easy to control, and fast, so that immediate switching can be implemented.

(2) During switching between the manned state and the unmanned state, devices do not need to be rearranged. In the manned state, positions of the display screen 2 and the control console 3 both meet ergonomic requirements of the driver. In the unmanned state, the back surface 22 of the display screen 2 overlaps with a horizontal plane, causing no blocking to a visual field of the front windshield, and the control console 3 is closer to a front end of a vehicle head, so that not only a visual field of a passenger can be increased, but also a passenger space is increased.

However, in a case that a rail vehicle in the related art is designed according to a requirement that spatial positions of devices remain unchanged during switching: if the rail vehicle is designed with an unmanned driver console, when the rail vehicle is switched to the manned state, the driver can only stand during driving, which does not meet ergonomic requirements; if the rail vehicle is designed with a manned driver console, when the rail vehicle is switched to the unmanned state, the cab 200 has a narrow space and is not aesthetic enough, which affects passenger experience; and if two driver consoles need to be designed according to the manned state and the unmanned state during switching, when positions of a driver console control panel and a display screen control panel need to be changed during the switching, changes of a driver console mounting skeleton and vehicle body device holders are involved at the same time, and the switching process is time-consuming and labor-consuming.

(3) The locking mechanism 6 can lock the control console 3 and the baffle 4 at the same time, and the control console 3 and the display screen 2 are in linked movement. Therefore, in the unmanned state, the locking mechanism 6 can lock the display screen 2, the control console 3, and the baffle 4 at the same time, and in the manned state, the locking mechanism 6 can lock the display screen 2 and the control console 3 at the same time, thereby simplifying the entire driver console 100. In addition, unlock and lock actions can be performed by using only one key, which is simple to control.

In the descriptions of this specification, descriptions of a reference term such as "an embodiment", "some embodiments", "an example", "a specific example", or "some examples" means that a specific feature, structure, material, or characteristic that is described with reference to the embodiment or the example is included in at least one embodiment or example of the present disclosure. In this specification, schematic descriptions of the foregoing terms are not necessarily directed at the same embodiment or example. Besides, the specific feature, the structure, the material, or the characteristic that is described may be combined in proper manners in any one or more embodiments or examples. In addition, a person skilled in the art may integrate or combine different embodiments or examples described in this specification and features of the different embodiments or examples as long as they are not contradictory to each other.

Although the embodiments of the present disclosure have been shown and described, a person of ordinary skill in the art may understand that various changes, modifications, replacements, and variations may be made to the embodiments without departing from the principles and spirit of the present disclosure, and the scope of the present disclosure is as defined by the appended claims and their equivalents.

What is claimed is:

1. A driver console, comprising:
a console body, comprising an accommodating space;
a display screen, wherein the display screen is movable between a first position and a second position relative to the console body, at the first position, at least a display portion of the display screen is exposed to be in an available state, and at the second position, the display portion of the display screen is at least accommodated in the accommodating space to be in a non-available state;
a control console, wherein the control console is movable between a third position and a fourth position relative to the console body, at the third position, at least a control portion of the control console is exposed to be in an available state, and at the fourth position, the control portion of the control console is at least accommodated in the accommodating space to be in a non-available state; and
a mechanical mechanism, wherein the mechanical mechanism is configured to cause the display screen to be movable between the first position and the second position, and configured to cause the control console to be movable between the third position and the fourth position,
wherein the mechanical mechanism comprises a pivot component, the pivot component is configured to cause the display screen to be rotatable in a reciprocating manner around a first horizontal axis relative to the console body, the first horizontal axis runs through a center of the display screen, and the first horizontal axis is located below the horizontally placed console surface,
wherein the mechanical mechanism comprises a linkage apparatus, and the linkage apparatus is constructed to: cause the control console to move to the third position while causing the display screen to move to the first position; and cause the control console to move to the fourth position while causing the display screen to move to the second position,
wherein the linkage apparatus is a first crank sliding block mechanism, and the first crank sliding block mechanism comprises: the pivot component, the slide component, and a link rod, wherein the pivot component is configured to cause the display screen to be rotatable in a reciprocating manner around the first horizontal axis relative to the console body, the slide component is configured to cause the control console to be translatable in a reciprocating manner in a front-rear direction relative to the console body, one end of the link rod is rotatably connected with the display screen, and the other end of the link rod is rotatably connected with the control console.

2. The driver console according to claim 1, wherein the display screen is entirely accommodated in the accommodating space at the second position.

3. The driver console according to claim 2, wherein the console body comprises a horizontally placed console surface, and the accommodating space comprises an upper opening formed on the horizontally placed console surface; and at the second position, a front surface of the display screen faces downward and is accommodated in the accommodating space, and a back surface of the display screen fills in the upper opening.

4. The driver console according to claim 3, wherein at the first position, the display screen is at least partially moved out to above the upper opening, and the front surface of the display screen intersects with a horizontal plane to form an obtuse angle.

5. The driver console according to claim 1, wherein the control console is entirely accommodated in the accommodating space at the fourth position.

6. The driver console according to claim 5, wherein the console body comprises a vertically placed console surface, and the accommodating space comprises a rear opening formed on the vertically placed console surface; at the third position, the control console is at least partially moved to the rear of the rear opening; and at the fourth position, the control console is entirely accommodated forward in the accommodating space.

7. The driver console according to claim 6, wherein the mechanical mechanism comprises a slide component, and the slide component is configured to cause the control console to be translatable in a reciprocating manner in a front-rear direction relative to the console body.

8. The driver console according to claim 6, further comprising:
a baffle, wherein the baffle is movable between a blocking position and an avoiding position, at the blocking position, the baffle covers the rear opening, and at the avoiding position, the baffle avoids the rear opening.

9. The driver console according to claim 8, further comprising:
a hinge, wherein the hinge is connected between the baffle and the console body, to cause the baffle to be rotatable in a reciprocating manner around a second horizontal axis relative to the console body, and the second horizontal axis is at a bottom side of or below the rear opening.

10. The driver console according to claim 8, further comprising:
a locking mechanism, wherein the locking mechanism is switchable between a locked state and an unlocked state, and in the locked state, the locking mechanism is configured to lock the baffle at the blocking position.

11. The driver console according to claim 10, wherein in the locked state, the locking mechanism is configured to lock the control console at the third position, and is configured to lock the control console at the fourth position.

12. The driver console according to claim 10, wherein the locking mechanism comprises: a lock head and a third crank sliding block mechanism, the lock head is fixed to the console body and a locking hole is formed on the lock head, and the third crank sliding block mechanism comprises: a second crank, a second slide member, and a second connecting rod, wherein a first end of the second crank is opposite to the locking hole and is rotatable around a longitudinal axis, the second slide member is configured to translate in a reciprocating manner in a horizontal direction relative to the console body, an outer end of the second slide member is configured to lock a second lock pin of the baffle, one end of the second connecting rod is rotatably connected with a second end of the second crank, and the other end of the second connecting rod is rotatably connected with an inner end of the second slide member.

13. The driver console according to claim 12, wherein the locking mechanism comprises a second crank sliding block mechanism, and the second crank sliding block mechanism comprises: a first crank, a first slide member, and a first connecting rod, wherein a first end of the first crank and the first end of the second crank are configured to synchronously rotate around the longitudinal axis, the first slide member is configured to translate in a reciprocating manner in a vertical direction relative to the console body, a lower end of the first slide member is configured to lock a first lock pin of the control console, one end of the first connecting rod is rotatably connected with a second end of the first crank, and the other end of the first connecting rod is rotatably connected with an upper end of the first slide member.

14. A rail vehicle, comprising a cab and a driver console arranged in the cab, wherein the driver console is the driver console according to claim 1.

15. The driver console according to claim 1, wherein the first horizontal axis is located above the slide component, when the display screen is at the second position, the control console is located at the fourth position and below the display screen, and a top portion and a rear portion of the accommodating space are both opened.

16. The driver console according to claim 1, further comprising:
a locking mechanism, wherein the locking mechanism is switchable between a locked state and an unlocked state, and in the locked state, the locking mechanism is configured to lock the control console at the third position, and is configured to lock the control console at the fourth position.

17. The driver console according to claim 16, wherein the locking mechanism comprises: a lock head and a second crank sliding block mechanism, the lock head is fixed to the console body and a locking hole is formed on the lock head, and the second crank sliding block mechanism comprises: a first crank, a first slide member, and a first connecting rod, wherein a first end of the first crank is opposite to the locking hole and is rotatable around a longitudinal axis, the first slide member is configured to translate in a reciprocating manner in a vertical direction relative to the console body, a lower end of the first slide member is configured to lock a first lock pin of the control console, one end of the first connecting rod is rotatably connected with a second end of the first crank, and the other end of the first connecting rod is rotatably connected with an upper end of the first slide member.

18. The driver console according to claim 17, wherein the mechanical mechanism comprises the slide component configured to cause the control console to translate in a reciprocating manner in a front-rear direction relative to the console body, and the slide component comprises a slide rail extending in a front-rear direction and a slider inserted in the slide rail and configured to slide in a front-rear direction, wherein a rear end of the slide rail comprises a first slot, a front end of the slider comprises a second slot, a rear end of the slider comprises a third slot, at the third position, the first slot and the second slot are opposite to each other and are lockable by the first lock pin, and at the fourth position, the first slot and the third slot are opposite to each other and are lockable by the first lock pin.

* * * * *